(No Model.)
S. C. MEGILL.
JACK SCREW.
No. 253,617. Patented Feb. 14, 1882.
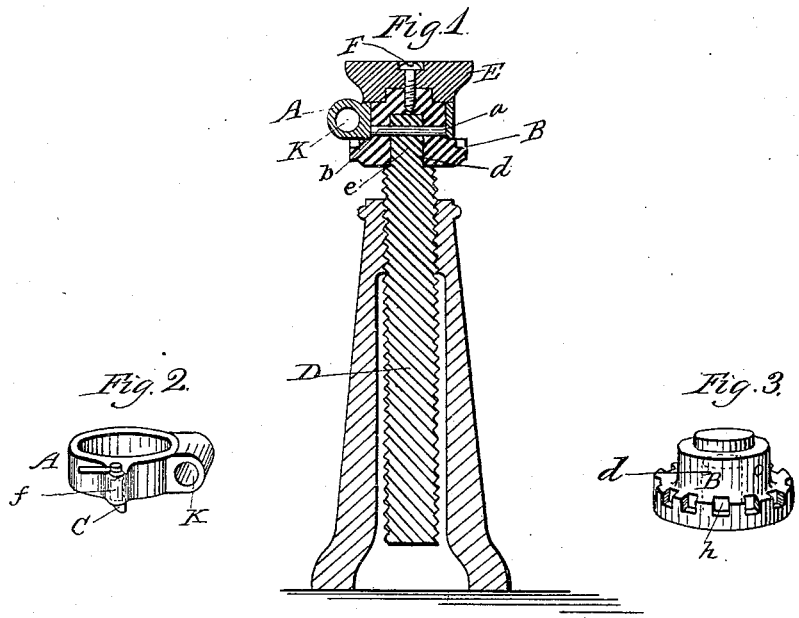
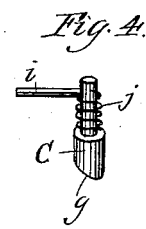
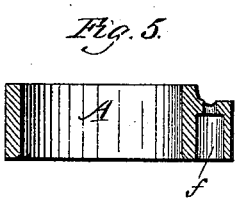
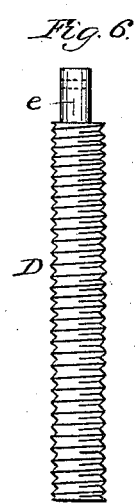
WITNESSES —
J. B. Townsend
Chas. E. Gaylord.
INVENTOR —
Seburg C. Megill

UNITED STATES PATENT OFFICE.

SEBRING C. MEGILL, OF CHICAGO, ILLINOIS.

JACK-SCREW.

SPECIFICATION forming part of Letters Patent No. 253,617, dated February 14, 1882.

Application filed May 3, 1881. (No model.)

*To all whom it may concern:*

Be it known that I, SEBRING C. MEGILL, of Chicago, in the county of Cook and State of Illinois, have invented a new and useful Improvement in Jack-Screws, which improvement is fully set forth in the following specification and accompanying drawings, in which—

Figure 1 is a sectional view of my improved jack-screw.

A, Fig. 2, is a perspective view of the purchase-ring and vertical pawl or bolt-carrier with pawl-socket $f$ and purchase-socket K.

Fig. 3 is a perspective view of the detachable head, showing the holes or ratchet-teeth in which the pawl or bolt engages, so that when moved forward or backward it imparts a rotary motion to the screw. The head is made fast to the screw by a pin, $b$, which passes through the head and tenon on the screw D, as shown at Fig. 1, or by any other suitable method.

Fig. 4: C is a view of the pawl or bolt, with handle $i$ and pressure-spring $j$ attached. The spring is used to keep the pawl or bolt always in position.

Fig. 5: A is a section view of the purchase-ring and vertical pawl or bolt-carrier A, showing the socket and spring-chamber $f$, in which the pawl or bolt C acts, and is confined and allowed to act freely when it is being operated.

Fig. 6: D is a view of a common screw, with tenon $e$ on one end, made to fit in the socket $d$ of the detachable head B.

The object of my invention is to construct a stronger, simpler, and more durable ratchet-head for jack-screws than any now in use. The parts of this ratchet-head, as will be seen, are very simple, so in case of making repairs the parts, one or all, can be readily taken apart and replaced without any great loss of time or trouble, thus obviating the trouble and lost time, which is the case with other ratchet jack-screw heads.

The screw D, as shown in Fig. 6 of the accompanying drawings, is a common screw, with a round or other suitable-shaped tenon made on the end of the screw, and made to fit the corresponding socket or mortise in the detachable head, Fig. 3. The head is held in place or fastened to the screw by a hole being drilled through the head B, Fig. 3, and tenon $e$ on the end of the screw D, Fig. 6, and having a pin, $b$, passed through the hole and held there by the purchase-ring, Fig. 2, being placed in position as shown at $a$ in Fig. 1. The purchase-ring and pawl-carrier are held in its position on the head by the washer E being placed on the top of it and held there by the small screw F. To remove the head from the screw D in case of making repairs, remove the small screw F, washer E, and purchase-ring A, and then the pin $b$ can be pushed out, which will then allow the head B to be removed. The detachable head B has holes or parallel ratchet-teeth at the base, cast or drilled in, as may be required; also, one center socket or mortise, as shown by the dotted lines at $d$, Figs. 3 and 1 in the drawings, to receive and fit the tenon $e$ on screw D, Figs. 6 and 1. The socket and spring-chamber $f$ on the purchase-ring A, Fig. 5, is made round, so that the pawl or bolt C can be turned from right to left, thereby forming a reversible pawl or bolt, the large end of which is beveled, so that in the backward motion the pawl will not engage in the teeth $h$, Fig. 3, but will pass over without causing any backward motion to the screw as it is being operated. On the stem of the pawl or bolt C is a spring, $j$, to hold the pawl down to make sure of the pawl or bolt engaging in the teeth when required.

The operation of my ratchet-head is not confined to screws with tenon on one end, but can be applied to screws with tenons on both ends, or for other purposes.

Having thus described my invention, what I claim as new, and desire to secure by Letters Patent, is—

1. The purchase-ring and pawl-carrier A, with socket K on the side to receive the purchase-lever, and socket $f$, in which the pawl acts, substantially as described and shown.

2. The removable head with holes or ratchet-teeth $h$ and center socket, $d$, substantially as described and shown.

3. The pawl C, with handle $i$, in combination with spring $j$, substantially as described and shown.

4. The screw D, with tenon $e$, in combination with ratchet and removable head B, substantially as described and shown.

5. The screw D and the ratchet-ring cap B, rigidly secured thereon, combined with the pawl-ring A, seated on the exterior periphery of said cap, and removable therefrom without disturbing the connection of cap B with the screw.

6. The screw D, the ratchet-ring cap B, rigidly secured thereto, and the pawl-ring A, seated on the exterior periphery of said cap, combined with the removable swivel-table or cap E, resting upon the cap B, and capable of turning thereon to support the weight to be lifted without contact with the screw.

SEBRING C. MEGILL.

Witnesses:
J. A. McINTOSH,
L. A. GOULD.